Patented Oct. 13, 1953

2,655,529

UNITED STATES PATENT OFFICE 2,655,529

CALCIUM CHOLINE CITRATE SALT OF P-AMINO SALICYLIC ACID

Heinrich Hopff and Hermann Spaenig, Ludwigshafen (Rhine), Germany

No Drawing. Application January 31, 1952, Serial No. 269,341. In Germany February 1, 1951

1 Claim. (Cl. 260—501)

This invention relates to new derivatives of para-aminosalicylic acid and to a process for producing them.

The difficultly soluble calcium salt of para-aminosalicylic acid contains one calcium atom per para-aminosalicylic acid residue and can be prepared according to application Serial No. 213,796 by the reaction of para-aminosalicylic acid with an equimolecular amount of a calcium compound.

We have now found that therapeutically valuable derivatives of para-aminosalicylic acid can be obtained by reacting the said difficultly soluble calcium salt of para-aminosalicylic acid with about the equimolecular amount of a choline salt of a polybasic acid which still contains a hydrogen atom replaceable by a metal.

The preparation of the new para-aminosalicylic acid derivatives may be carried out by adding about the equivalent amount of the difficultly soluble calcium salt of para-aminosalicylic acid in aqueous suspension to an aqueous solution of an acid choline salt of the said kind, such as monocholine citrate or monocholine phosphate, and stirring until a clear solution has been formed. After evaporation under reduced pressure, there separates a calcium-choline-citric acid-para-aminosalicylic acid double salt which has the following formula:

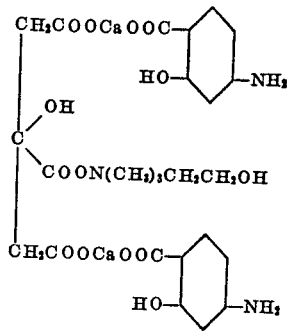

The reaction may also be carried out in organic solvents. Examples of other acid choline salts which are suitable for the process of the present invention are the acid choline salts of tartaric acid, maleic acid and butene tetracarboxylic acid.

The following example will serve further to illustrate this invention but the invention is not limited to this example. The parts are by weight.

Example 340 parts of a difficultly soluble calcium salt of para-aminosalicylic acid (having a calcium content of 16.2%) are suspended in 500 parts of water and 400 parts of a 70% aqueous solution of monocholine citrate (molecular ratio about 2:1) are added. As soon as a clear solution has been formed, it is clarified with animal charcoal and evaporated under reduced pressure. The calcium-choline-citric acid-para-aminosalicylic acid double salt is obtained as a white powder. This new salt is useful as a tuberculostatic.

What we claim is:

A para-aminosalicylic acid derivative of the formula

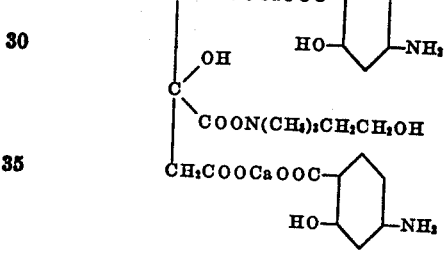

HEINRICH HOPFF.
HERMANN SPAENIG.

No references cited.